(12) United States Patent
Donar

(10) Patent No.: US 7,219,001 B2
(45) Date of Patent: May 15, 2007

(54) TRANSMISSION SHIFT INDICATOR APPARATUS AND METHOD

(75) Inventor: Paul D. Donar, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 172 days.

(21) Appl. No.: 10/930,530

(22) Filed: Aug. 31, 2004

(65) Prior Publication Data

US 2006/0047396 A1    Mar. 2, 2006

(51) Int. Cl.
*G06F 19/00*    (2006.01)
(52) U.S. Cl. .......................... 701/64; 701/51; 340/456
(58) Field of Classification Search .................... None
See application file for complete search history.

(56) References Cited

U.S. PATENT DOCUMENTS

| | | |
|---|---|---|
| 4,070,927 A | 1/1978 | Polak |
| 5,601,506 A | 2/1997 | Long et al. |
| 5,893,894 A * | 4/1999 | Moroto et al. ................. 701/53 |
| 6,037,862 A * | 3/2000 | Ying .......................... 340/441 |
| 6,085,706 A * | 7/2000 | Kadowaki et al. ....... 123/90.15 |
| 6,774,780 B1 * | 8/2004 | Neubecker .................. 340/456 |

FOREIGN PATENT DOCUMENTS

WO    WO 01/23787    *  4/2001

* cited by examiner

Primary Examiner—Michael J. Zanelli
(74) Attorney, Agent, or Firm—Christopher DeVries

(57) ABSTRACT

A transmission system for a vehicle includes an automatic transmission configured to automatically change speed ratios between an input member and an output member. An indicator is configured to provide an indication of predetermined speed ratio changes to a driver inside a passenger compartment. A corresponding method is also provided. The method includes establishing a speed ratio, determining that a speed ratio change is appropriate, and generating an indication perceptible to a driver.

7 Claims, 2 Drawing Sheets

TRANSMISSION SHIFT INDICATOR APPARATUS AND METHOD

TECHNICAL FIELD

This invention relates to vehicle transmission systems that include an indicator configured to provide an indication inside a passenger compartment of the occurrence of a predetermined speed ratio change.

BACKGROUND OF THE INVENTION

Prior art vehicles include automatic transmissions that simplify vehicle operation by changing speed ratios, i.e., "shifting," automatically based on such factors as vehicle speed, engine speed, and throttle position. Thus, the driver has some influence over when the transmission shifts via the accelerator pedal, but has limited direct control over the timing of the shift.

Although the driver may have no need to know when a shift is occurring in typical vehicle operation, there may be instances where awareness of an automatic shift is desirable. For example, some high-performance vehicles have a transmission controller that is programmed to make an automatic transmission behave more like a manual transmission under certain predefined driving scenarios. More specifically, one vehicle controller is programmed to detect if the vehicle is going around a turn by evaluating the lateral vehicle acceleration, throttle, and braking history. With positive detection, the controller is programmed to command a downshift from the transmission so that the vehicle will respond with power when the throttle tip-in occurs upon completion of the turn.

SUMMARY OF THE INVENTION

A vehicle transmission system is provided. The transmission system includes an automatic transmission having an input member and an output member. The transmission is configured to selectively establish a plurality of discrete, successive speed ratios between the input member and the output member. The transmission system also includes an indicator operatively connected to the transmission and configured to provide an indication to a human driver of the occurrence of a predetermined speed ratio change between the input member and the output member.

The transmission system of the invention thus allows a driver to be prepared for the occurrence of the predetermined speed ratio change. The indicator may provide an audial indication, such as an audible tone, a visual indication, such as light from a light-emitted diode (LED), etc.

A corresponding method is also provided. The method includes establishing a speed ratio between a transmission input member and a transmission output member, determining that a speed ratio change is appropriate, and generating an indication perceptible by a human vehicle driver in response to determining that the speed ratio change is appropriate.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
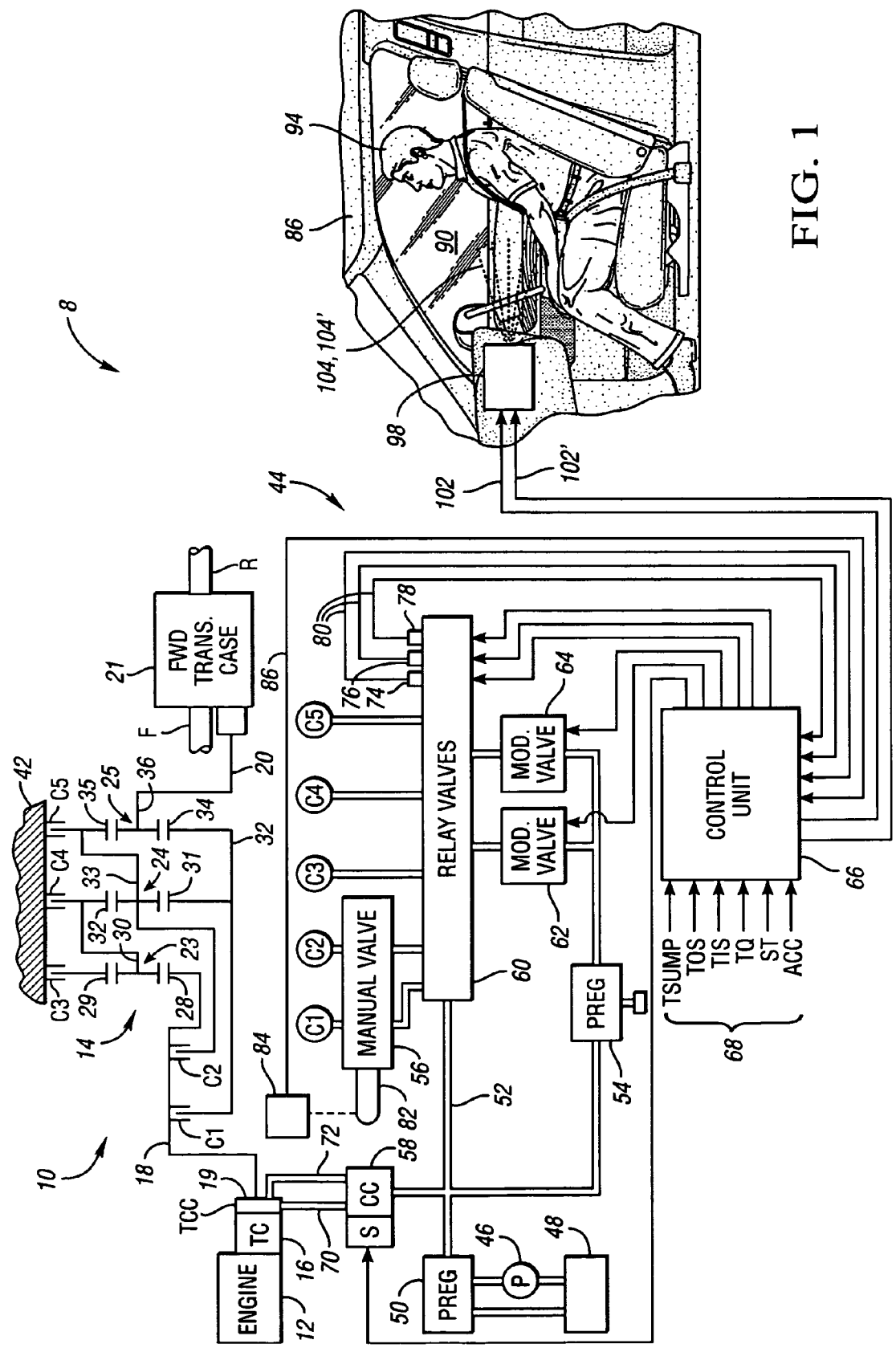
FIG. 1 is a schematic illustration of a vehicle including an automatic transmission.

Referring to FIG. 1, a vehicle 8 includes a powertrain 10 including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three interconnected planetary gear sets, designated generally by the reference numerals 23, 24 and 25. The planetary gear set 23 includes a sun gear member 28, a ring gear member 29, and a planet carrier assembly 30. The planet carrier assembly 30 includes a plurality of pinion gears rotatably mounted on a carrier member and disposed in meshing relationship with both the sun gear member 28 and the ring gear member 29. The planetary gear set 24 includes a sun gear member 31, a ring gear member 32, and a planet carrier assembly 33. The planet carrier assembly 33 includes a plurality of pinion gears rotatably mounted on a carrier member and disposed in meshing relationship with both the sun gear member 31 and the ring gear member 32. The planetary gear set 25 includes a sun gear member 34, a ring gear member 35, and a planet carrier assembly 36. The planet carrier assembly 36 includes a plurality of pinion gears rotatably mounted on a carrier member and disposed in meshing relationship with both the sun gear member 34 and the ring gear member 35.

The input shaft 18 continuously drives the sun gear 28 of gear set 23, selectively drives the sun gears 31, 34 of gear sets 24, 25 via clutch C1, and selectively drives the carrier 33 of gear set 24 via clutch C2. The ring gears 29, 32, 35 of gear sets 23, 24, 25 are selectively connected to ground 42 via clutches (i.e., brakes) C3, C4 and C5, respectively. Planetary gear sets are described in U.S. Pat. No. 4,070,927, issued Jan. 31, 1978 to Polak, which is hereby incorporated by reference in its entirety.

Figures 2, 3:
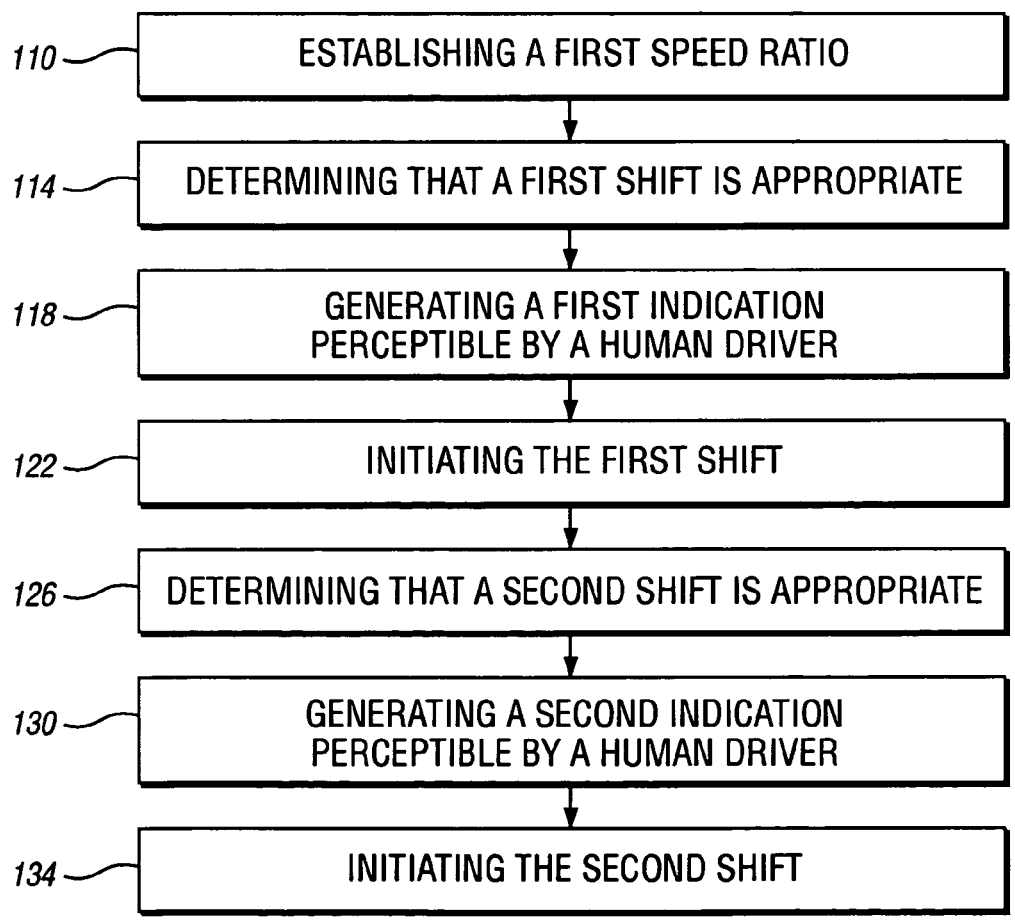
FIG. 2 is a truth table indicating a relationship between transmission clutch activation and corresponding speed ratio.
FIG. 3 is a block diagram illustrating an exemplary control logic for the automatic transmission of FIG. 1.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. An exemplary electro-hydraulic control system is described in U.S. Pat. No. 5,601,506, issued Feb. 11, 1997 to Long et al, which is hereby incorporated by reference in its entirety. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid-operated fluid control valves 58, 60, 62 and 64.

The electronic portion of the electro-hydraulic control system 44 is primarily embodied in the transmission control unit 66, or controller, which is microprocessor-based and conventional in architecture. The transmission control unit 66 controls the solenoid-operated fluid control valves 58–64 based on a number of inputs 68 to achieve a desired transmission speed ratio. Such inputs include, for example, signals representing the transmission input speed TIS, a driver torque command TQ, the transmission output speed TOS, the hydraulic fluid temperature Tsump, and the shift type (ST), e.g., a 1–2 upshift. Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid-operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, fluid control valves 60 are a set of three on/off relay valves, shown in FIG. 1 as a consolidated block, and are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other one of the modulated valves 62, 64 to the off-going clutch.

The modulated valves 62, 64 each comprise a conventional pressure regulator valve biased by a variable pilot pressure that is developed by current controlled force motors (not shown). Fluid control valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands. Thus, the clutches C1–C5 are responsive to the pressure commands via the valves 58–64 and their respective actuating elements (e.g., solenoids, current-controlled force motors).

The vehicle 8 includes a body 86 that defines a passenger compartment 90 in which a driver 94 is situated during vehicle operation. An indicator 98, i.e., a device configured to generate an indication perceptible by the driver 94, is operatively connected to the transmission controller 66. The controller 66 is programmed and configured to transmit a first signal 102 when the controller 66 determines that a predetermined speed ratio change is appropriate. The controller 66 determines that a speed ratio change is appropriate when the controller's programmed algorithm indicates that a speed ratio other than the established speed ratio between the input and output members is appropriate for the values of inputs 68.

The indicator 98 is responsive to signal 102 to generate and provide a first indication 104 of the predetermined speed ratio change within the passenger compartment 90. Within the scope of the claimed invention, the indication 104 may be prior to, during, or subsequent to the actual occurrence of the speed ratio change. Exemplary indicators include speakers to provide an audial indication, LEDs to provide a visual indication, etc. In the context of the claimed invention, an indication is provided "inside the passenger compartment" if the indication is perceptible inside the passenger compartment. In a preferred embodiment, a radio and speakers constitute the indicator; the radio and speakers provide a chime audible within the passenger compartment in response to the signal 102.

Alternatively, and within the scope of the claimed invention, the controller 66 may be configured to transmit the first signal 102 for a first predetermined speed ratio change, such as a downshift. The controller may also be configured to transmit a second signal 102' for a second predetermined speed ratio change different from the first speed ratio change, such as an upshift. The second signal 102' causes indicator 98 to generate a second indication 104' different from the first indication 104. For example, indication 104 may be a single chime, and indication 104' may be two successive chimes.

In the context of the present invention, a "predetermined speed ratio change" includes a speed ratio change of a predetermined type, such as a 2–1 downshift, a speed ratio change when one or more predetermined conditions exist, such as a vehicle parameter or input 68 being above or below a predetermined value, etc. In an exemplary embodiment, the controller is programmed to detect if the driver is going around a turn by evaluating the lateral vehicle acceleration ACC, throttle, and braking history. With a positive detection, the controller will command a downshift from the transmission so the vehicle will respond with power when throttle tip in occurs upon the completion of the turn. Concurrent with commanding a forced downshift, the controller will also generate signal 102.

The controller 66 is preferably connected to the indicator 98 by a serial communication bus or network that connects several electrical components of the vehicle, such as the radio, instrument panel, etc.

Referring to FIG. 3, a corresponding method is schematically depicted. The method includes establishing a first speed ratio between a transmission input member and a transmission output member (step 110). The method also includes determining that a first speed ratio change, i.e., a shift, is appropriate (step 114), which typically includes analyzing various input parameters, such as vehicle speed, accelerator pedal position or throttle position, engine speed, etc., and employing a predetermined algorithm to determine a speed ratio for the present input parameter values. When the speed ratio determined by the algorithm for the present input parameter values is different from the first speed ratio, then a shift is appropriate.

The method further includes generating a first indication perceptible by a human vehicle driver (step 118) in response to determining that the first speed ratio change is appropriate. The method may also include initiating the first speed ratio change whereby a second speed ratio different from the first speed ratio is established between the input member and the output member (step 122). Step 122 may include releasing an off-going clutch and engaging an on-coming clutch.

The method may also include determining that a second speed ratio change is appropriate (step 126), and generating a second indication different from the first indication in response to determining that the second speed ratio change is appropriate (step 130). For example, if the first speed ratio change is a downshift, and the second speed ratio change is an upshift, the first indication may be one audible chime and the second indication may be two successive audible chimes. The method may further include initiating the second speed ratio change whereby a third speed ratio is established between the input member and the output member (step 134). The third speed ratio is different from the second speed ratio, and may or may not be the same as the first speed ratio within the scope of the claimed invention.

While the best mode for carrying out the invention has been described in detail, those familiar with the art to which this invention relates will recognize various alternative designs and embodiments for practicing the invention within the scope of the appended claims.

The invention claimed is:

1. A vehicle comprising:
   an automatic transmission having an input member and an output member, and being configured to selectively establish a plurality of discrete speed ratios between the input member and the output member;
   a controller programmed for detecting the presence of a turning condition, said controller being operable to command a downshift from said transmission in response to said condition so said vehicle will respond when throttle tip-in occurs upon completion of said turn, wherein said detecting the presence of a turning condition comprises evaluating lateral vehicle acceleration, throttle, and braking history;
   a vehicle body defining a passenger compartment; and
   an indicator operatively connected to the transmission and configured to provide an indication inside the passenger compartment of the occurrence of a predetermined speed ratio change between the input member and the output member; wherein said indicator is a radio speaker within said passenger compartment.

2. The vehicle of claim 1, wherein the indicator further comprises a light-emitting device.

3. The vehicle of claim 1, wherein the transmission includes a controller configured to initiate speed ratio changes between the input member and the output member by generating command signals to release an off-going clutch and engage an on-coming clutch; and wherein the controller is configured to transmit a signal to the indicator to which the indicator is responsive to provide the indication.

4. A method comprising:
   establishing a first speed ratio between a transmission input member and a transmission output member;
   determining the presence of a turning condition and that a first shift is appropriate wherein said determining the presence of a turning condition comprises evaluating lateral vehicle acceleration, throttle, and braking history;
   generating a first indication perceptible by a human vehicle driver in response to said determining that a first shift is appropriate.

5. The method of claim 4, further comprising initiating the first shift whereby a second speed ratio different from the first speed ratio is established between the input member and the output member.

6. The method of claim 4, further comprising determining that a second shift is appropriate, and generating a second indication perceptible by the human vehicle driver, the second indication being different from the first indication.

7. The method of claim 6, further comprising initiating the second shift whereby a third speed ratio different from the second speed ratio is established between the input member and the output member.

* * * * *